(12) United States Patent
Mittersteiner et al.

(10) Patent No.: US 7,163,238 B1
(45) Date of Patent: Jan. 16, 2007

(54) CONNECTOR FOR FLEXIBLE AND SEMI-RIGID PIPINGS

(75) Inventors: Melchor Mittersteiner, Santiago (CL); Sergio Barrientos, Santiago (CL)

(73) Assignee: Tecnologia Hidraulica THC S.A., Santiago (CL)

( * ) Notice: Subject to any disclaimer, the term of this patent is extended or adjusted under 35 U.S.C. 154(b) by 0 days.

(21) Appl. No.: 11/249,738

(22) Filed: Oct. 14, 2005

Related U.S. Application Data

(60) Provisional application No. 60/705,555, filed on Aug. 5, 2005.

(51) Int. Cl.
*F16L 33/00* (2006.01)

(52) U.S. Cl. .................. 285/242; 285/256; 285/259

(58) Field of Classification Search ............ 285/242, 285/255, 256, 259
See application file for complete search history.

(56) References Cited

U.S. PATENT DOCUMENTS

| | | | | |
|---|---|---|---|---|
| 646,590 A | * | 4/1900 | Williams | 285/247 |
| 4,088,349 A | * | 5/1978 | Guest | 285/255 |
| 4,736,969 A | * | 4/1988 | Fouts | 285/247 |
| 4,887,847 A | * | 12/1989 | Barnoach | 285/52 |
| 4,951,976 A | * | 8/1990 | Boelkins | 285/114 |
| 4,991,876 A | * | 2/1991 | Mulvey | 285/21.1 |
| 5,178,423 A | * | 1/1993 | Combeau | 285/247 |
| 5,364,135 A | * | 11/1994 | Anderson | 285/38 |
| 5,470,113 A | * | 11/1995 | Schwalm et al. | 285/255 |
| 5,904,376 A | * | 5/1999 | Yuen | 285/39 |
| 6,003,906 A | * | 12/1999 | Fogarty et al. | 285/242 |
| 6,050,608 A | * | 4/2000 | Hattori et al. | 285/39 |
| 7,014,216 B1 | * | 3/2006 | Mittersteiner et al. | 285/247 |
| 2004/0051303 A1 | * | 3/2004 | Lorenz | 285/12 |

* cited by examiner

*Primary Examiner*—James M. Hewitt
(74) *Attorney, Agent, or Firm*—Shlesinger, Arkwright & Garvey LLP

(57) ABSTRACT

A connector for a flexible pipe comprises a connector body having an end portion for coupling to a flexible pipe. The end portion includes a frusto-conical portion and an adjacent cylindrical portion. The frusto-conical portion has its widest portion adjacent the cylindrical portion and has a diameter greater than the diameter of the cylindrical portion and forms a radially extending substantially transverse shoulder with the cylindrical portion to force the pipe to form a bulge around the shoulder. The frusto-conical portion has its narrowest portion with a diameter slightly less than the inside diameter of the pipe to facilitate insertion into the pipe. A ring has a cylindrical inner surface with an inside diameter substantially equal to the outside diameter of the pipe. The ring is positioned to overlie the shoulder thereby to compress the bulge against the shoulder and seal the pipe to the connector body.

16 Claims, 4 Drawing Sheets

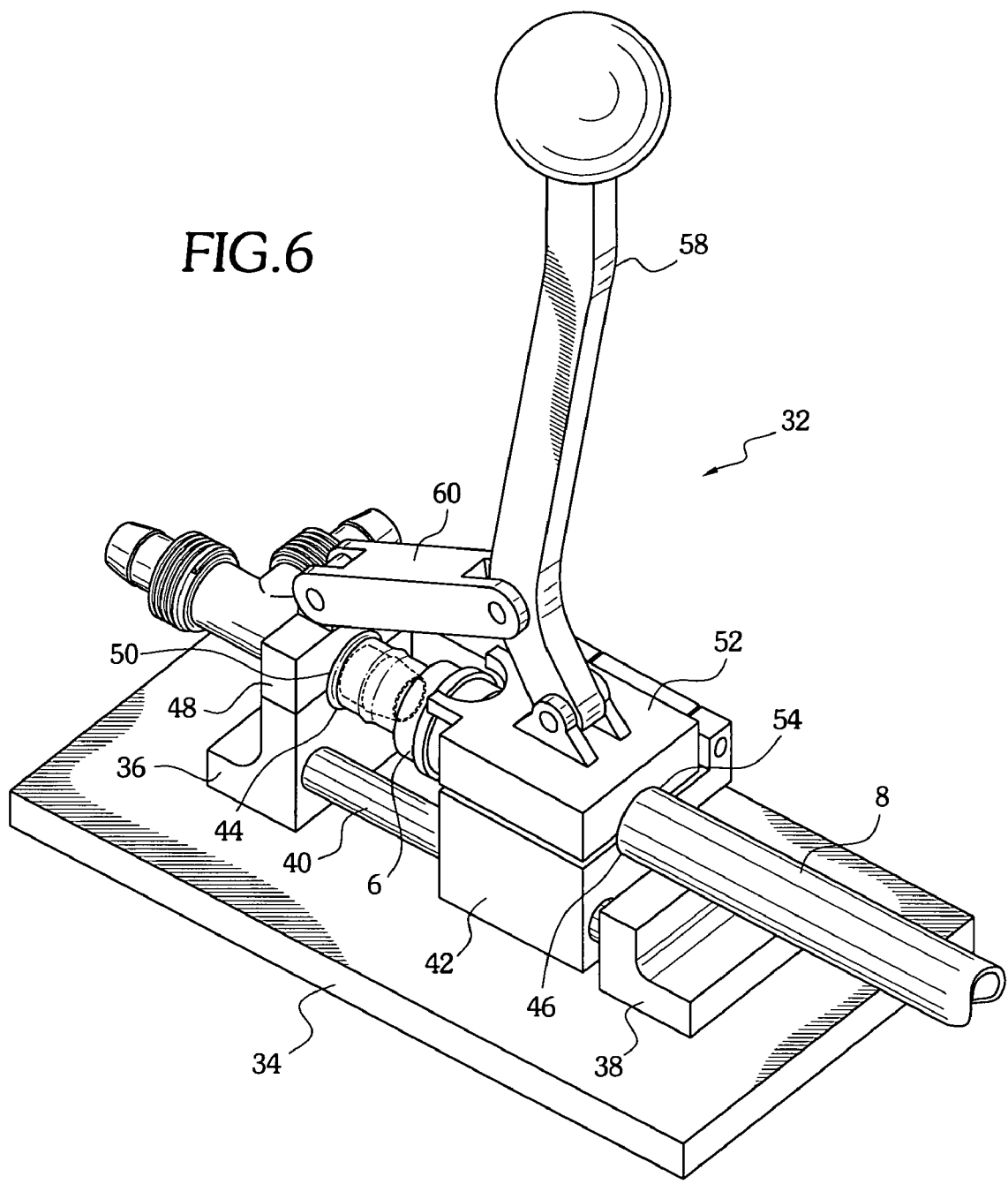

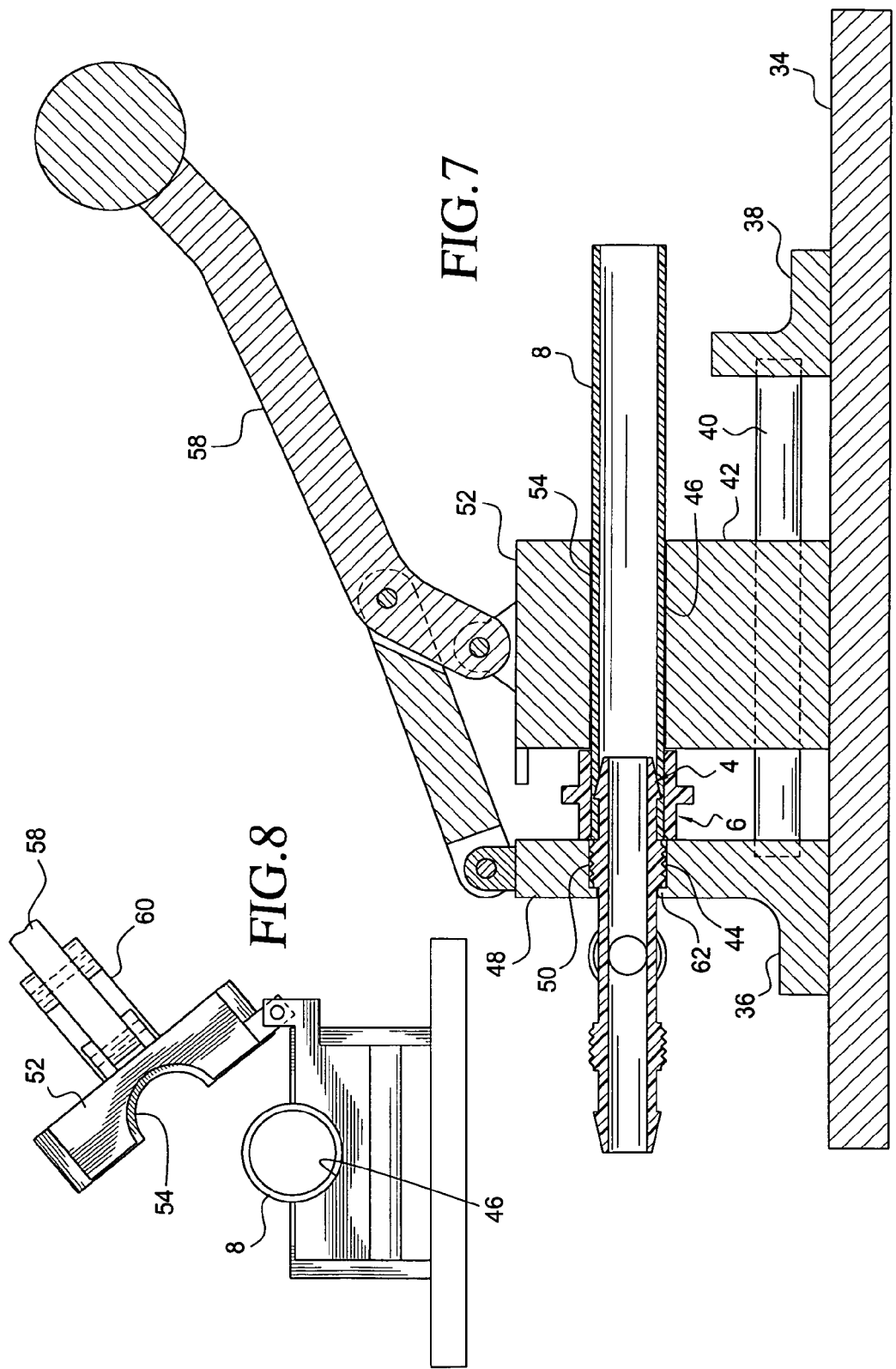

CONNECTOR FOR FLEXIBLE AND SEMI-RIGID PIPINGS

RELATED APPLICATION

This is a nonprovisional application, which claims the priority benefit of provisional application Ser. No. 60/705,555, filed Aug. 5, 2005.

FIELD OF THE INVENTION

The present invention relates generally to the assembly of flexible pipes, such as polyethylene, polybutylene, polypropylene, flexible polyesters, polyamides, flexible PVC, or the like, and particularly to a connector for fast connection to a pipe.

BACKGROUND OF THE INVENTION

The present invention improves upon U.S. Pat. No. 5,178,423.

OBJECTS AND SUMMARY OF THE INVENTION

It is an object of the present invention to provide a connecter for flexible or semi-rigid pipings that can be installed relatively quickly, requiring only an axial force relative to the length of the pipe.

The present invention provides a connector for a flexible pipe comprising a connector body having an end portion for coupling to a flexible pipe. The connector body includes a frusto-conical portion and an adjacent cylindrical portion. The frusto-conical portion tapers from wide to narrow into the pipe. The frusto-conical portion has its widest portion adjacent the cylindrical portion and has a diameter greater than the diameter of the cylindrical portion and forms a radially extending substantially transverse shoulder with the cylindrical portion to force the pipe to form a bulge around said shoulder. The frusto-conical portion has its narrowest portion with a diameter slightly less than the inside diameter of the pipe, thereby facilitating insertion of the frusto-conical portion into the pipe. A sleeve has a cylindrical inner surface with an inside diameter substantially equal to the outside diameter of the pipe. The sleeve is positioned to overlie the shoulder thereby to compress the bulge against the shoulder and seal the pipe to the connector body.

The present invention also provides a tool that may be used for installing the connector described herein.

These and other objects of the present invention will become apparent from the following detailed description.

BRIEF DESCRIPTIONS OF THE DRAWINGS

FIG. 6 is a perspective view of a tool which may be used to install the connector of FIG. 1, shown to prior to pushing the clamping ring into the connector body.

FIG. 7 is a cross-sectional view of the tool of FIG. 6, showing the tool after having pushed the clamping ring into the connector body.

FIG. 8 is an end view of the tool of FIG. 6, shown in the open position.

DETAILED DESCRIPTION OF THE INVENTION

Figure 1:
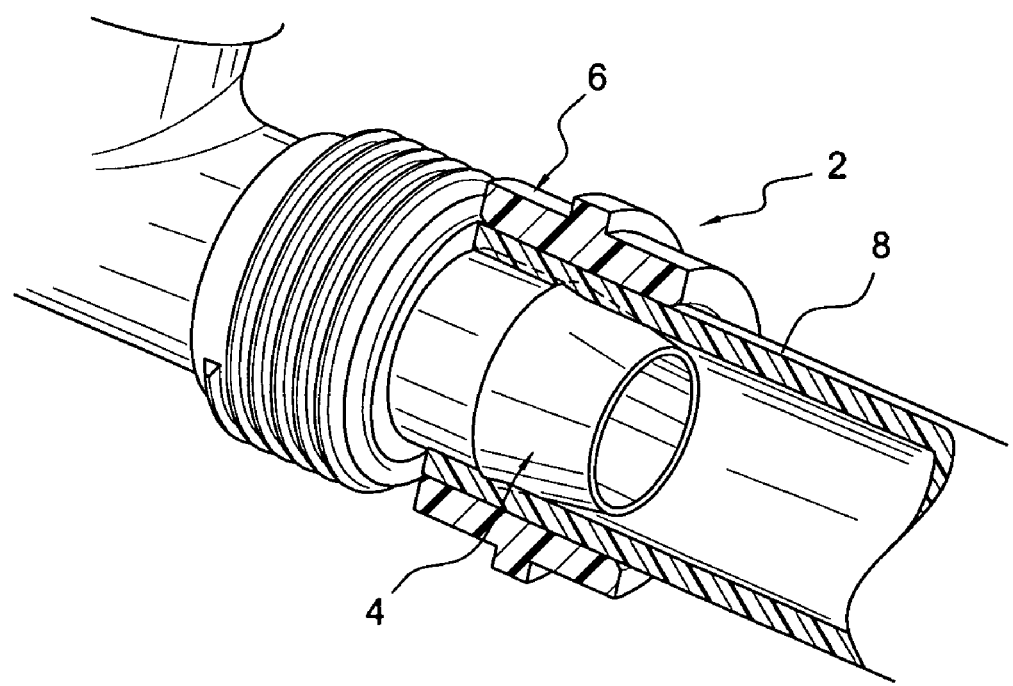
FIG. 1 is perspective, partly cross-section view of a pipe connector made in accordance with the present invention.
Figure 2:
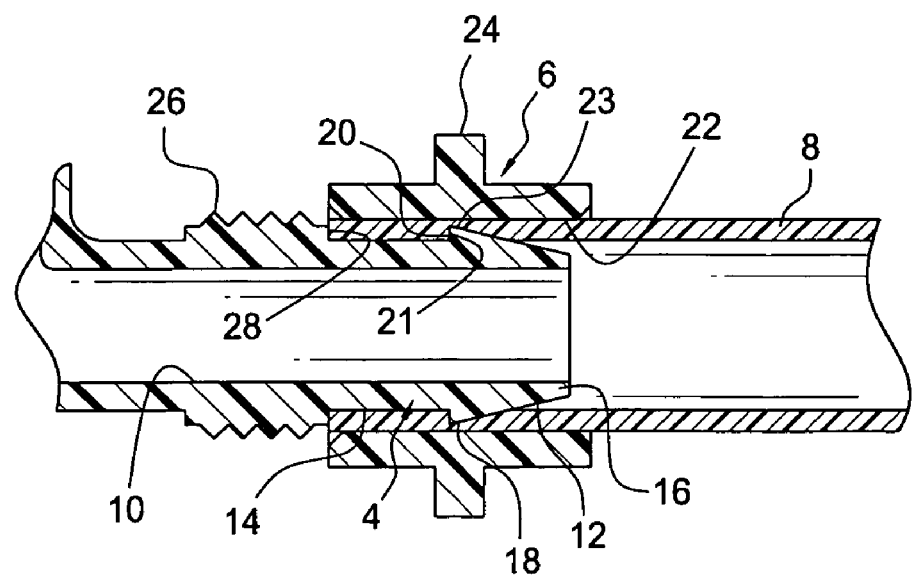
FIG. 2 is a longitudinal cross-sectional view of the connector of FIG. 1.

A pipe connector 2 made in accordance with the present invention is disclosed in FIG. 1. The connector comprises a connector body 4 and a clamping ring 6. A pipe 8 is seen secured to the body 4 in a way that will be described below. The body 4 and the ring 6 are preferably made of a plastic material which is harder than the material from which the pipe is made.

The body 4 has a central opening 10 in communication with the interior of the pipe 8. The body 4 includes an outer frusto-conical end portion 12 joined to an adjacent cylindrical portion 14. The frusto-conical portion 12 has a smaller diameter portion 16 which is slightly less than the inside diameter of the pipe 8 to facilitate insertion of portion 12 into the pipe. The frusto-conical portion 12 has a larger diameter portion 18 which is greater than the inside diameter of the pipe 8. The cylindrical portion 14 has a diameter slightly greater than the inside diameter of the pipe 8 and less than the diameter of the portion 18 such that a radially extending substantially transverse shoulder 20 is formed at the junction between the cylindrical portion 14 and the frusto-conical portion 12. The shoulder 20 includes a radial surface 21 that forms a peripheral edge 23 with the larger diameter portion 18 of the frusto-conical end portion 12. The cylindrical portion 14 is preferably long enough to allow the pipe edge to extend beyond the shoulder 20, where it is stretched out, to where the pipe edge is able to return to its original diameter.

The ring 6 has an inside diameter substantially equal to the outside diameter of the pipe 8. The ring 6 has an inside cylindrical surface 22. A rib 24 may be provided in an area around and above the shoulder 20 in the installed position to provide for greater rigidity in resisting the outward forces exerted by the portion of the pipe at the shoulder 20 when it is compressed by the ring 6. However, a person skilled in the art will understand that the rib 24 may not be required if the ring 6 is suitably designed to a thickness to resist the compressive forces involved during use.

The body 4 also includes a threaded portion 26 for cooperating with a nut, such that shown in U.S. Pat. No. 5,178,423, which may be used in lieu of the ring 6. The threaded portion 26 also forms a flange 28 at the boundary with the cylindrical portion 14 that advantageously serves as a stop for the end of the hose 8 when inserted into the connector body 4. The flange also advantageously provides the function of a guide as to how far the ring 6 is inserted over the body 4. It is preferable that the rib 24 or the middle portion of the ring 6 be positioned above the shoulder 20 when the ring 6 is installed.

Figure 3:
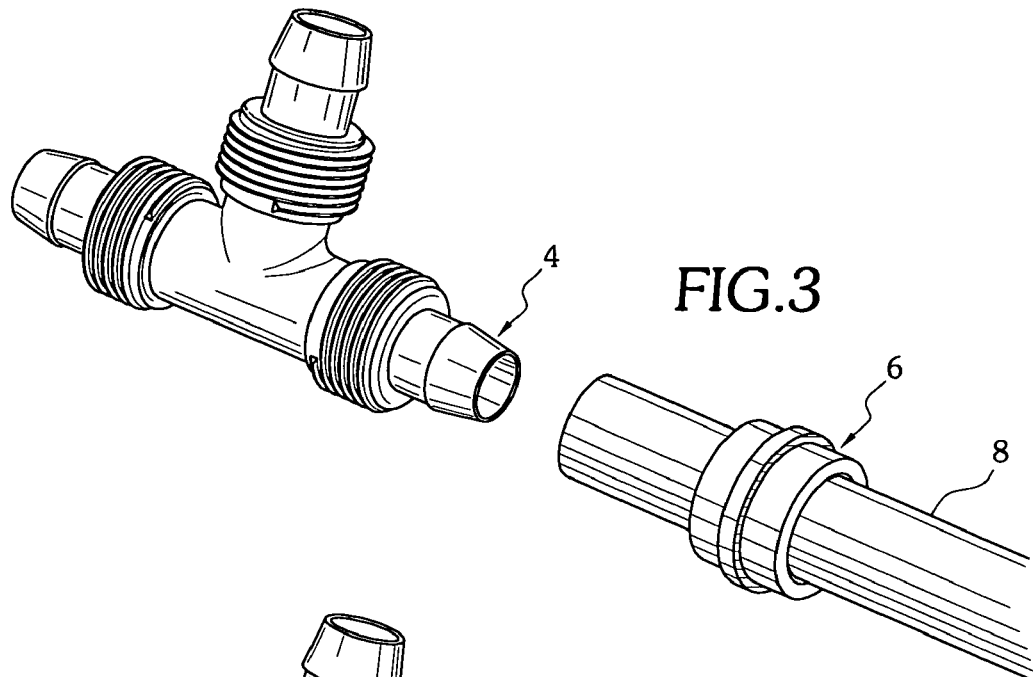
FIGS. 3–5 are perspective assembly drawings of the connector of FIG. 1.
Figure 4:
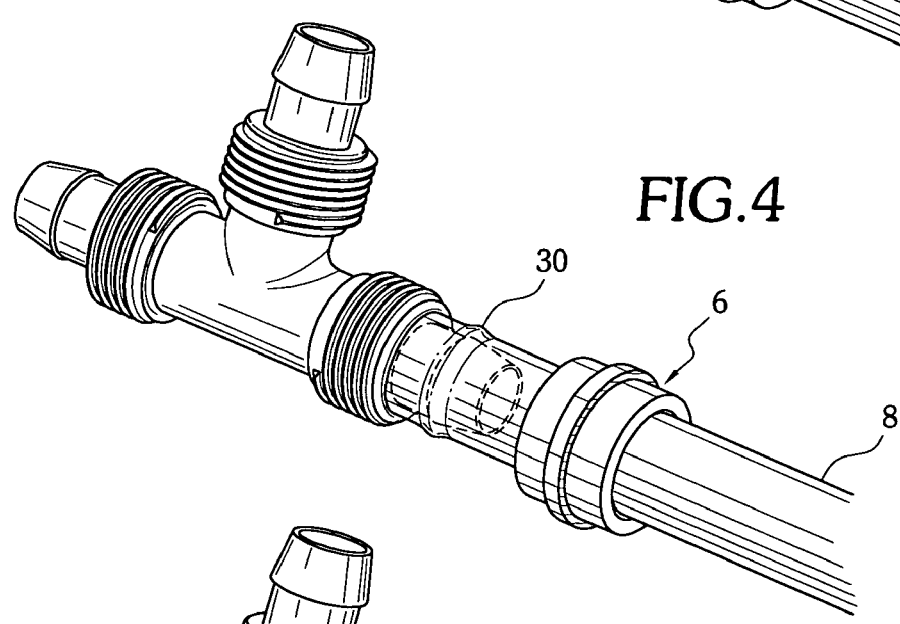
Figure 5:
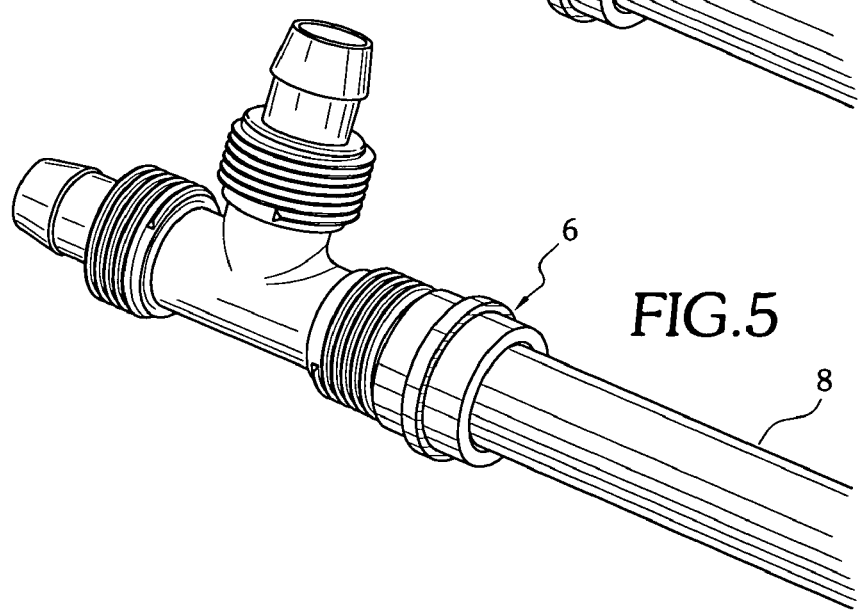

In operation, the ring 6 is inserted at one end of the pipe 8, as best shown in FIG. 3. The pipe is then inserted onto the connector body 4. The shoulder 20 creates a circumferential bulge 30, as best shown in FIG. 4. The end of the pipe is butted against the flange 28. The clamping ring 6 is slipped over the frusto-conical portion 12 and the cylindrical portion 14, as best shown in FIGS. 1 and 5. The ring 6 is preferably positioned substantially centrally of the shoulder 20. The flange 28 advantageously provides a marker as to how far the ring 6 is slipped over the connector body 4. The ring 6 presses down on the bulge 30 against the edge 23, thereby providing a seal.

The connector 2 may be integrated into any fitting requiring connection to a pipe, such as a T-fitting shown in FIG. 3, a straight fitting for connecting two sections of a pipe, a valve fitting, etc.

A tool 32 which may be used for installing the ring 6 onto the pipe 8 is disclosed in FIG. 6. The tool 32 includes a base onto which are secured oppositely disposed brackets 36 and 38. A pair of parallel tubular rails support in sliding manner a pipe support body 42. The top surfaces of the bracket 36 and the body 42 are provided with half-cylindrical depressions 44 and 46, respectively, for cradling the threaded portion of the connector body 4 and the pipe 8, respectively, as best shown in FIG. 7. A pivoting member 48 is hingedly secured to the bracket 36 and is provided with a complementary half-cylindrical depression 50. Another pivoting member 52 is hingedly secured to the sliding body 42 and is provided with a complementary half-cylindrical depression 54. The pivot axes of the members 48 and 52 are aligned such that both members may be pivoted at the same time by a handle 58.

The handle 58 is pivotably secured to the member 52. An arm 60 further pivotably connects the handle 58 to the member 48. The handle 58 provides the necessary leverage in pushing the ring 6 onto the connector body 4 and the pipe 8.

In operation, the members 48 and 52 are pivoted to the open position by pushing the handle 58 to the right in FIG. 8. The threaded portion 26 and the pipe 8 are then seated on the respective depressions 44 and 46, with the ring 6 positioned between the bracket 36 and the body 42. The pivoting members 48 and 52 are closed, as shown in FIG. 8, and the handle 58 pulled in the direction away from connector body 4, thereby pushing the sliding member 42 and the attached member 52 toward the end of the pipe 8. The ring 6, which is engaged to the vertical face of the members 42 and 52 are thus pushed and slid onto the pipe until the leading edge of the ring 6 engages the opposite face of the bracket 36 and the member 48, as best shown in FIG. 7. At this point, the installation is complete and the handle is again pushed to the right in FIG. 8 to release the pipe 8 and the connector. The threaded portion 26 is held in place by a flange 62 while the ring 6 is being pushed, as best shown in FIG. 8.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A flexible pipe and connector assembly, comprising:
   a) a connector body for coupling to the flexible pipe;
   b) said connector body including a frusto-conical portion and an adjacent cylindrical portion, said frusto-conical portion tapering from wide to narrow into the pipe;
   c) said frusto-conical portion having its widest portion adjacent said cylindrical portion and having a diameter greater than the diameter of said cylindrical portion and forming a radially extending substantially transverse shoulder with said cylindrical portion to force the pipe to form a bulge around said shoulder;
   d) said frusto-conical portion having its narrowest portion with a diameter slightly less than the inside diameter of the pipe thereby facilitating insertion of said frusto-conical portion into the pipe and
   e) a solid ring without radial holes, said ring having a cylindrical inner surface, the inside diameter of the ring being uniform and substantially equal to the outside diameter of the pipe, said cylindrical inner surface is positioned to overlie said cylindrical portion and said shoulder thereby to compress the bulge against said shoulder and seal the pipe to said connector body, the inside diameter of the ring remaining uniform after installation.

2. A flexible pipe and connector assembly, as in claim 1, wherein said cylindrical portion has a length substantially longer than the height of said transverse shoulder.

3. A flexible pipe and connector assembly, as in claim 1, wherein said cylindrical portion has a diameter slightly larger than the diameter of said frusto-conical portion narrowest portion.

4. A flexible pipe and connector assembly, as in claim 3, wherein said cylindrical portion has a diameter slightly larger than the inside diameter of the pipe.

5. A flexible pipe and connector assembly, as in claim 1, wherein said shoulder includes a radial surface forming a peripheral edge with said widest portion.

6. A flexible pipe and connector assembly, as in claim 1, wherein said connector body includes a threaded portion adjacent said cylindrical portion.

7. A flexible pipe and connector assembly, as in claim 6, wherein said threaded portion forms a flange at a juncture with said cylindrical portion.

8. A flexible pipe and connector assembly, as in claim 1, wherein said connector body is made of plastic.

9. A flexible pipe and connector assembly, as in claim 1, wherein said ring is made of plastic.

10. A flexible pipe and connector assembly, as in claim 1, wherein:
    a) said ring includes an outside cylindrical surface; and
    b) a rib disposed around said cylindrical surface between opposite end portions of said ring.

11. A flexible pipe and connector system, comprising:
    a) a connector body for coupling to the flexible pipe;
    b) said connector body including a frusto-conical portion and an adjacent cylindrical portion, said frusto-conical portion tapering from wide to narrow into the pipe;
    c) said frusto-conical portion having its widest portion adjacent said cylindrical portion and having a diameter greater than the diameter of said cylindrical portion and forming a radially extending substantially transverse shoulder with said cylindrical portion to force the pipe to form a bulge around said shoulder;
    d) said frusto-conical portion having its narrowest portion with a diameter slightly less than the inside diameter of the pipe thereby facilitating insertion of said frusto-conical portion into the pipe;
    e) a solid ring without radial holes, said ring having a cylindrical inner surface, the inside diameter of the ring being uniform and substantially equal to the outside diameter of the pipe, said cylindrical inner surface is positioned to overlie said cylindrical portion and said shoulder thereby to compress the bulge against said shoulder and seal the pipe to said connector body; and
    f) a tool including a holder for holding said connector body and a sliding member for pushing said ring onto said connector body, thereby to position said ring to overlie said cylindrical portion and said shoulder.

12. A flexible pipe and connector system as in claim 11, wherein said tool further comprises:

a) a base;
b) said holder is secured to said base;
c) a guide operably secured to said base;
d) said sliding member is slidably secured to said guide, said sliding member including a vertical face for engaging an edge of said ring; and
e) a lever for moving said sliding member toward said holder and pushing said ring onto said connector body.

13. A flexible pipe and connector system as in claim 12, wherein said holder comprises:
   a) a bracket secured to said base, said bracket includes a first top surface having a first half-cylindrical depression;
   b) a first member pivotably secured to said bracket, said first member having a second half-cylindrical depression on a first bottom surface facing said first top surface, said second half-cylindrical depression being complementary to said first half-cylindrical depression; and
   said first and second half-cylindrical depressions are adapted to receive and hold said connector body while said ring is being pushed by said sliding member.

14. A flexible pipe and connector system as in claim 13, wherein said sliding member comprises:
   a) a sliding base member secured to said guide, said sliding member includes a second top surface having a third half-cylindrical depression;
   b) a second member pivotably secured to said sliding member, said second member having a fourth half-cylindrical depression on a second bottom surface facing said second top surface, said fourth half-cylindrical depression being complementary to said third half-cylindrical depression;
   c) said third and fourth half-cylindrical depressions are adapted to encircle the pipe; and
   d) said sliding base member and said second member include said vertical face.

15. A flexible pipe and connector system as in claim 14, wherein said first and second members are connected to each other.

16. A flexible pipe and connector system as in claim 12, wherein:
   a) said lever includes a handle pivotably connected to said sliding member; and
   b) an arm pivotably connected to said holder and an intermediate portion of said handle such that pulling or pushing on said handle causes said sliding member to move toward or away from said holder, respectively.

* * * * *